(12) United States Patent
You et al.

(10) Patent No.: US 11,290,876 B2
(45) Date of Patent: Mar. 29, 2022

(54) KEY DERIVATION METHOD AND APPARATUS

(71) Applicant: XI'AN ZHONGXING NEW SOFTWARE CO., LTD., Xi'An (CN)

(72) Inventors: Shilin You, Shenzhen (CN); Zhaoji Lin, Shenzhen (CN); Jin Peng, Shenzhen (CN); Hongjun Liu, Shenzhen (CN); Xiaowu Zhao, Shenzhen (CN)

(73) Assignee: XI'AN ZHONGXING NEW SOFTWARE CO., LTD., Xi'An (CN)

( * ) Notice: Subject to any disclaimer, the term of this patent is extended or adjusted under 35 U.S.C. 154(b) by 308 days.

(21) Appl. No.: 16/320,704

(22) PCT Filed: Jun. 13, 2017

(86) PCT No.: PCT/CN2017/088111
§ 371 (c)(1),
(2) Date: Jan. 25, 2019

(87) PCT Pub. No.: WO2018/019046
PCT Pub. Date: Feb. 1, 2018

(65) Prior Publication Data
US 2019/0166493 A1 May 30, 2019

(30) Foreign Application Priority Data
Jul. 27, 2016 (CN) .......................... 201610599048.8

(51) Int. Cl.
*H04W 12/04* (2021.01)
*H04W 12/06* (2021.01)
(Continued)

(52) U.S. Cl.
CPC ......... *H04W 12/041* (2021.01); *H04W 12/02* (2013.01); *H04W 12/037* (2021.01);
(Continued)

(58) Field of Classification Search
CPC . H04W 12/041; H04W 12/037; H04W 12/40; H04W 12/06; H04W 12/02; H04L 9/0861
See application file for complete search history.

(56) References Cited

U.S. PATENT DOCUMENTS

2016/0353465 A1* 12/2016 Vrzic ................ H04W 28/0247
2017/0070880 A1* 3/2017 Hahn .................... H04W 12/02
(Continued)

FOREIGN PATENT DOCUMENTS

| CN | 101232731 A | 7/2008 |
|----|-------------|--------|
| CN | 101610147 A | 12/2009 |

(Continued)

OTHER PUBLICATIONS

International Search Report and Written Opinion for International Appl. No. PCT/CN2017/088111, dated Aug. 24, 2017.
(Continued)

*Primary Examiner* — Catherine Thiaw
(74) *Attorney, Agent, or Firm* — Foley & Lardner LLP

(57) ABSTRACT

Provided are a key derivation method and device. The method includes: acquiring a slice identifier corresponding to a network slice to which a user equipment is currently attached, where the slice identifier uniquely identifies the network slice; and transmitting the slice identifier to a designated communication device. The slice identifier is configured to instruct the designated communication device to derive, according to the slice identifier, an intermediate key required by the network slice. By means of the technical solution described above, the problem in the related art that a slice function cannot be implemented normally due to the fact that different network slices probably use the same intermediate key may be solved, and different network slices may correspond to different intermediate keys, thereby avoiding a case that the slicing function cannot be imple- (Continued)

mented normally caused by allocating the same intermediate key to different network slices.

15 Claims, 5 Drawing Sheets

(51) Int. Cl.
| | | |
|---|---|---|
| *H04L 9/08* | (2006.01) | |
| *H04W 12/041* | (2021.01) | |
| *H04W 12/02* | (2009.01) | |
| *H04W 12/037* | (2021.01) | |
| *H04W 12/40* | (2021.01) | |

(52) U.S. Cl.
CPC ........... *H04W 12/40* (2021.01); *H04L 9/0861* (2013.01); *H04W 12/06* (2013.01)

(56) References Cited

U.S. PATENT DOCUMENTS

| | | | | |
|---|---|---|---|---|
| 2017/0111339 | A1* | 4/2017 | Lee | H04L 9/00 |
| 2017/0206115 | A1* | 7/2017 | Shimojou | H04L 41/5054 |
| 2017/0318450 | A1* | 11/2017 | Salkintzis | H04W 60/04 |
| 2018/0007552 | A1* | 1/2018 | Bae | H04L 63/08 |
| 2018/0048465 | A1* | 2/2018 | Schliwa-Bertling | H04L 9/0662 |
| 2018/0184297 | A1* | 6/2018 | Mohamed | H04W 12/08 |
| 2019/0021047 | A1* | 1/2019 | Zong | H04W 8/26 |
| 2019/0159029 | A1* | 5/2019 | Li | H04L 29/06 |
| 2019/0357103 | A1* | 11/2019 | Jin | H04W 36/14 |

FOREIGN PATENT DOCUMENTS

| | | |
|---|---|---|
| CN | 104951353 A | 9/2015 |
| CN | 105224385 A | 1/2016 |
| CN | 105577637 A | 5/2016 |
| WO | WO2016107203 A1 | 7/2016 |

OTHER PUBLICATIONS

"Key hierarchy schemes for network slicing", 3GPP TSG SA WG3 (security) Meeting #84, S3-160965, ZTE, p. 5 of the text.

"Key hierarchy schemes for network slicing", 3GPP TSG SA WG3 (security) Meeting #84, S3-161140, ZTE, pp. 2-6.

First Office Action in CN Appl. No. 201610599048.8 dated Dec. 16, 2021.

First Search Report on CN Appl. No. 201610599048.8 dated Nov. 30, 2021.

* cited by examiner

KEY DERIVATION METHOD AND APPARATUS

CROSS REFERENCE TO RELATED APPLICATIONS

This is a National Stage Application, under 35 U.S.C. 371, of International Patent Application No. PCT/CN2017/088111, filed on Jun. 13, 2017, which claims priority to Chinese patent application No. 201610599048.8 filed on Jul. 27, 2016, contents of both of which are incorporated herein by reference in their entireties.

TECHNICAL FIELD

The present disclosure relates to the field of communications and, in particular, to a key derivation method and device.

BACKGROUND

The mobile communications has developed rapidly in the past more than 20 years, which has brought huge impacts on people's lifestyle, working methods, and social, political and economic development. The human society has entered an effective information age, and the demand for service applications in all aspects has exploded. It will bring huge challenges to the future wireless mobile bandwidth system in terms of frequency, technology and operation.

In addition to providing services for people's communication, the future mobile network will provide access services for more and more Internet of Things (IoT) terminals. The IoT access brings new challenges and opportunities to mobile networks. Different types of IoTs have different requirements for the network. Some require the network to provide high real-time and high-reliability services, such as telemedicine. Some require regular small data transmission services, such as remote meter reading systems. For different service needs, the mobile network may need to be properly optimized to meet service requirements. More and more IoTs put more and more optimization requirements on the mobile network. Some of the optimization requirements may be contradictory. Therefore, a converged core network is unable to meet the various optimization requirements.

With the advent of network function virtualization (NFV), core network functions may be built on general-purpose hardware without the need of a dedicated hardware platform. The advent of the NFV makes it possible for operators to build different virtual core networks for different network service requirements. The virtual core network built for different network service requirements is called a network slice. Each network function in the virtual core network may be optimized and customized according to network service requirements. The network slice based on the NFV technology may be rapidly deployed according to requirements so as to quickly meet the requirements of different scenarios.

FIG. 1 is a schematic diagram for a network slice in the related art. FIG. 1 shows three network slices (network slices 1, 2 and 3). Each network slice forms a virtual core network, and provides the mobile network access service for a specific set of user equipments (UEs). A typical network slice includes a set of virtualized core network functions, such as a slice control plane unit which is mainly responsible for functions related to the slice mobility, session management and authentication, a slice user plane unit which mainly provides user resources of the slice to the user, a slice policy control unit which is responsible for the function of the user policy, and a slice charging unit which is responsible for the providing charging function for the user. The network slice is built by the operator according to the demands and operator policies. The function of each network slice is also determined by the operator according to the demands and the operator policies. In an example, some network slices may include a dedicated forwarding plane in addition to the control plane function, while some network slices may include only some basic control plane functions and share other core network related functions with other network slices. The network also includes a user data center/a user authentication center to save subscription data and certification materials of the user.

In a hierarchical key derivation system of the existing mobile communication system, a smart authentication card and an authentication center of the terminal respectively save the user's root key (K). Next, an encryption key (CK) and an integrity protection key (IK) are derived by using a key generation algorithm. Next, the terminal and the user data center derive an intermediate key (Kasme) by using the key generation algorithm. Next, the terminal and a mobility management entity respectively derive, by using the key generation algorithm, a non-access stratum key: the encryption key (KNASenc) and the integrity protection key (KNASint) as well as an access network key (KAN). Finally, the terminal and the access network derive, by using a key derivation algorithm, an access stratum key: a radio resource controlled encryption key (KRRCenc) and the radio resource controlled integrity protection key (KRRCint), and derive a user plane encryption key (KUPenc) and a user plane integrity protection key (KUPint).

In the existing art, the intermediate key generated by the same network may be used by different mobility management entities. That is, when the user moves, the mobility management entity requests a security context (including the intermediate key) from a previous mobile management entity. However, in the use of virtualization technology, different slices may implement different and independent services, and the data between different slices needs to be isolated. Therefore, the intermediate key is sensitive to different slices and cannot be used by different slices.

No effective solution has been provided to solve the problem in the related art that different network slices probably use the same intermediate key and the slice function cannot be implemented normally.

SUMMARY

Embodiments of the present disclosure provide a key derivation method and device, to at least solve the problem in the related art that different network slices probably use the same intermediate key, causing that the slice function cannot be implemented normally.

An embodiment of the present disclosure provides a key derivation method. The method includes:

acquiring a slice identifier corresponding to a network slice to which a user equipment is currently attached, and transmitting the slice identifier to a designated communication device. The slice identifier uniquely identifies the network slice. The slice identifier is configured to instruct the designated communication device to derive, according to the slice identifier, an intermediate key required by the network slice.

Alternatively, the step of transmitting the slice identifier to the designated communication device includes:

transmitting a first authentication request to the designated communication device, where the first authentication request carries the slice identifier, and the designated communication device includes at least one of: a user data center and a user authentication center.

Alternatively, the step of transmitting the slice identifier to the designated communication device includes:

receiving response information for the first authentication request, where the response information carries a security authentication vector; and transmitting a second authentication request to the designated communication device according to the security authentication vector, where the second authentication request carries the slice identifier, and the designated communication device includes the UE.

Alternatively, the method further includes: in response to determining that the UE needs to be handed over from the network slice to which the UE is currently attached to a second network slice, receiving an attach request message transmitted by an access network (AN), where the attach request message carries a service identifier; determining whether a service range of the second network slice includes a service corresponding to the service identifier; and in response to determining that the service range of the second network slice includes the service corresponding to the service identifier, transmitting the slice identifier to the designated communication device.

Alternatively, the slice identifier includes at least one of: identifier information of the network slice and temporary identifier information allocated by the network slice to the UE.

An embodiment of the present disclosure provides a key derivation method. The method includes:

receiving a slice identifier transmitted by a network slice, where the slice identifier uniquely identifies the network slice; and deriving an intermediate key required by the network slice according to the slice identifier.

Alternatively, the step of receiving the authentication request transmitted by the network slice includes receiving an authentication request transmitted by the network slice, where the authentication request carries the slice identifier.

Alternatively, the slice identifier includes at least one of: identifier information of the network slice and temporary identifier information allocated by the network slice to the UE.

An embodiment of the present disclosure further provides a key derivation device. The device includes an acquiring module and a transmitting module.

The acquiring module is configured to acquire a slice identifier corresponding to a network slice to which a user equipment is currently attached, where the slice identifier uniquely identifies the network slice. The transmitting module is configured to transmit the slice identifier to a designated communication device, where the slice identifier is configured to instruct the designated communication device to derive, according to the slice identifier, an intermediate key required by the network slice.

Alternatively, the transmitting module is further configured to transmit a first authentication request to the designated communication device, where the first authentication request carries the slice identifier, and the designated communication device includes at least one of: a user data center and a user authentication center.

Alternatively, the designated communication device includes the UE, and the transmitting module includes a receiving unit and a transmitting unit.

The receiving unit is configured to receive response information for the first authentication request, where the response information carries a security authentication vector.

The transmitting unit is configured to transmit a second authentication request to the designated communication device according to the security authentication vector, where the second authentication request carries the slice identifier.

Alternatively, the device further includes: a first receiving module, which is configured to, in response to determining that the UE needs to be handed over from the network slice currently attached by the UE to a second network slice, receive an attach request message forwarded by an access network (AN), where the attach request message carries a service identifier; and a determining module, which is configured to determine whether a service range of the second network slice includes a service corresponding to the service identifier. The transmitting module is configured to, in response to determining that the service range of the second network slice includes the service corresponding to the service identifier, transmit the slice identifier to the designated communication device.

An embodiment of the present disclosure further provides a key derivation device. The device includes a second receiving module and a deriving module.

The second receiving module is configured to receive a slice identifier transmitted by a network slice, where the slice identifier uniquely identifies the network slice. The deriving module is configured to derive an intermediate key required by the network slice according to the slice identifier.

Alternatively, the second receiving module is further configured to receive an authentication request transmitted by the network slice, where the authentication request carries the slice identifier.

An embodiment of the present disclosure further provides a key derivation device. The device includes a processor and a memory.

The memory is configured to store instructions executable by the processor. The processor is configured to acquire a slice identifier corresponding to a network slice to which a user equipment is currently attached, and transmit the slice identifier to a designated communication device. The slice identifier uniquely identifies the network slice, and the slice identifier is configured to instruct the designated communication device to derive, according to the slice identifier, an intermediate key required by the network slice.

An embodiment of the present disclosure further provides a computer storage medium, which is configured to store executable instructions for executing the key deriving method described in the above embodiments.

According to the embodiments of the present disclosure, the slice identifier is transmitted to the designated communication device, and the designated communication device may derive the intermediate key corresponding to the network slice according to the received slice identifier. By means of this technical solution, the problem in the related art that a slice function cannot be implemented normally due to the fact that different network slices use the same intermediate key is solved, and different network slices correspond to different intermediate keys, thereby avoiding a case that the slicing function cannot be implemented normally caused by allocating the same intermediate key to different network slices.

BRIEF DESCRIPTION OF DRAWINGS

The drawings described herein are used to provide a further understanding of the present disclosure and form a part of the present application. The exemplary embodiments and descriptions thereof in the present disclosure are used to explain the present disclosure and not to limit the present disclosure in any improper way. In the drawings.

DETAILED DESCRIPTION

Figure 1:
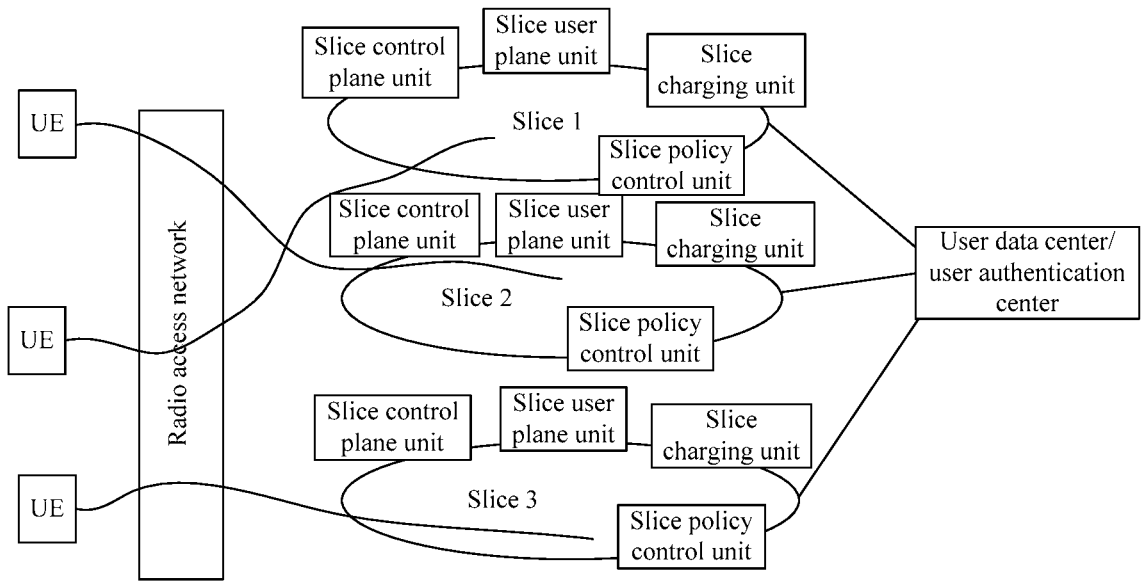
FIG. 1 is a schematic diagram for a network slice in the related art.

Hereinafter the present disclosure will be described in detail with reference to the drawings in conjunction with the embodiments. It is to be noted that if not in collision, the embodiments in the present application and features in the embodiments may be combined with each other.

It is to be noted that the terms "first", "second" and the like in the description, claims and drawings of the present disclosure are used to distinguish between similar objects and are not necessarily used to describe a particular order or sequence. It is to be understood that the data used in this way is interchangeable where appropriate so that embodiments of the present disclosure described herein may also be implemented in a sequence not illustrated or described herein. In addition, the terms "comprising", "including" or any other variations thereof described herein are intended to encompass a non-exclusive inclusion. For example, a process, method, system, product or device that includes a series of steps or elements may include not only the expressly listed steps or elements but also other steps or elements that are not expressly listed or are inherent to such a process, method, system, product or device.

Embodiment 1

A method embodiment of deriving a key is also provided according to this embodiment. It is to be noted that the steps illustrated in the flowcharts in the drawings may be performed by a computer system storing a group of computers executable instructions, and although logical sequences are illustrated in the flowcharts, the illustrated or described steps may be performed in sequences different from those described herein in some circumstances.

Figure 2:
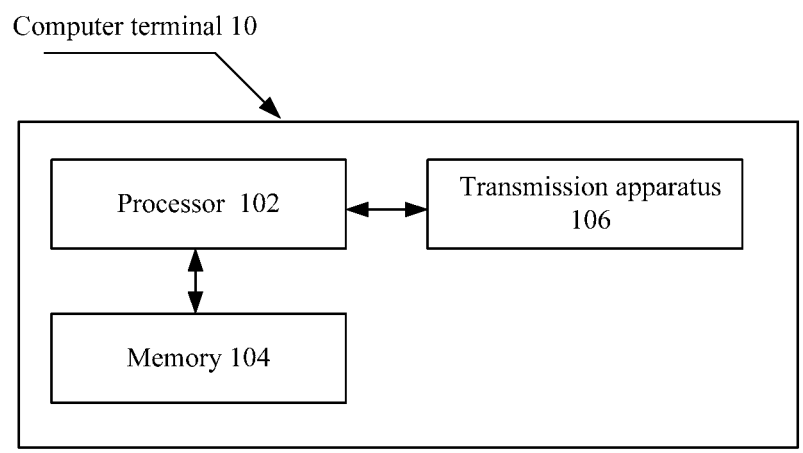
FIG. 2 is a block diagram of a hardware structure of a computer terminal for performing a key derivation method according to an embodiment of the present disclosure.

The method embodiment provided by the embodiment 1 of the present application may be executed on a mobile terminal, a computer terminal or other similar computing devices. An example in which the method is executed on the computer terminal is described below. FIG. 2 is a block diagram of a hardware structure of a computer terminal for performing a key derivation method according to an embodiment of the present disclosure. As shown in FIG. 2, a computer terminal 10 may include one or more (only one is shown in FIG. 2) processors 102 (the processor 102 may be, but is not limited to, a micro-processor MCU, a programmable logic device FPGA or another processing device), a memory 104 for storing data, and a transmission module 106 for communication function. It should be understood by those skilled in the art that the structure shown in FIG. 2 is merely illustrative and not intended to limit the structure of the electronic apparatus described above. For example, the computer terminal 10 may further include more or fewer components than that shown in FIG. 2, or has a configuration different from the configuration shown in FIG. 2.

The memory 104 may be used for storing software programs and modules of application software, such as program instructions/modules corresponding to the key derivation method in the embodiment of the present invention. The processor 102 executes the software programs and modules stored in the memory 104 so as to perform various function applications and data processing, that is, to implement the key derivation method described above. The memory 104 may include a high-speed random access memory, and may further include a nonvolatile memory, such as one or more magnetic storage devices, flash memories or other nonvolatile solid-state memories. In some examples, the memory 104 may further include memories that are remotely disposed with respect to the processor 102. These remote memories may be connected to the computer terminal 10 via a network. Examples of the network described above include, but are not limited to, the Internet, an intranet, a local area network, a mobile communication network and a combination thereof.

The transmission module 106 is used for receiving or transmitting data via a network. The above-mentioned specific examples of the network may include a wireless network provided by a communication provider of the computer terminal 10. In one example, the transmission module 106 includes a network interface controller (NIC), which may be connected to other network devices via a base station and thus be capable of communicating with the Internet. In one example, the transmission module 106 may be a radio frequency (RF) module, which is used for communicating with the Internet in a wireless way.

Figure 3:
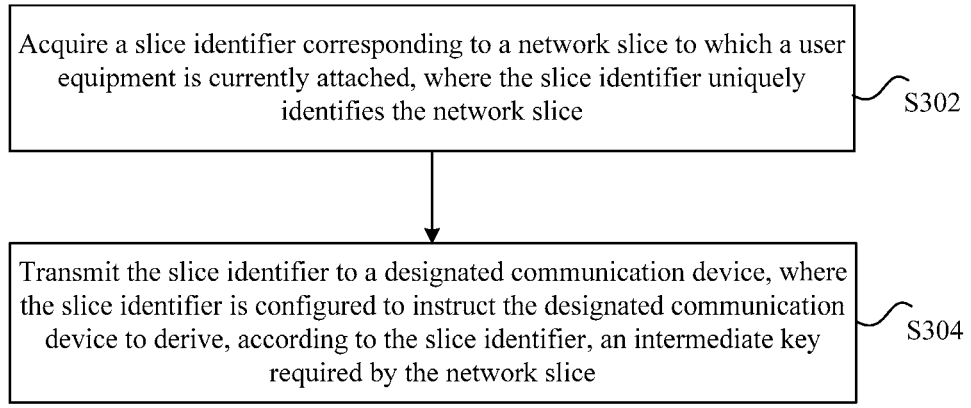
FIG. 3 is a flowchart of a key derivation method according to an embodiment 1 of the present disclosure.

The present disclosure provides a key derivation method in the above operating environment, which is shown in FIG. 3. FIG. 3 is a flowchart of a key derivation method according to the embodiment 1 of the present disclosure. As shown in FIG. 3, the method includes steps described below.

In step S302, a slice identifier corresponding to a network slice to which a user equipment (UE) is currently attached is acquired, where the slice identifier uniquely identifies the network slice.

In step S304, the slice identifier is transmitted to a designated communication device, where the slice identifier is configured to instruct the designated communication device to derive, according to the slice identifier, an intermediate key required by the network slice.

Through the steps described above, the slice identifier is transmitted to the designated communication device, and the designated communication device may derive the intermediate key corresponding to the network slice according to the received slice identifier. By means of this technical solution, the problem in the related art that a slice function cannot be implemented normally due to the fact that different network slices use the same intermediate key is solved, and different network slices correspond to different intermediate keys, thereby avoiding a case that the slicing function cannot be implemented normally caused by allocating the same intermediate key to different network slices.

The above-mentioned steps S302 and S304 may be executed by the network slice, or executed by other network devices of the network side, which is not limited by the present disclosure.

It is to be noted that the designated communication device includes a user data center, a user authentication center and the UE, or may be other communication devices capable of executing the step S304.

When the designated communication device includes at least one of the user data center and the user authentication center, the step S304 may be implemented in the following way:

transmitting a first authentication request to the designated communication device, where the first authentication request carries the slice identifier.

When the designated communication device is the UE, the step S304 may be implemented in the following way:

receiving response information for the first authentication request, where the response information carries a security authentication vector; and transmitting a second authentication request to the designated communication device according to the security authentication vector, where the second authentication request carries the slice identifier.

Alternatively, the method further includes: in response to determining that the UE needs to be handed over from the network slice to which the UE is currently attached to a second network slice, receiving an attach request message which carries a service identifier and is forwarded by an access network (AN); determining whether a service range of the second network slice includes a service corresponding to the service identifier; and in response to determining that the service range of the second network slice includes the service corresponding to the service identifier, transmitting the slice identifier to the designated communication device.

In this embodiment, the slice identifier includes at least one of: identifier information of the network slice and temporary identifier information allocated by the network slice to the UE.

The derivation process of the intermediate key may be summarized as follows: the slice transmits the authentication request to the user data center or the user authentication center; the user data center or the user authentication center derives the intermediate key by using the service network identifier and the slice identifier; the slice acquires the security vector from the user data center or the user authentication center and initiates the user authentication request to the UE; the UE authenticates successfully the slice, derives the intermediate key by using the service network identifier, the slice identifier and other parameters, and derives an access stratum key and a non-access stratum key by using the intermediate key; and the slice receives a UE authentication request response, authenticates successfully the UE and derives the access stratum key and an access network key by using the intermediate key.

A slice key derivation terminal is further provided in this embodiment. The UE is configured to derive the intermediate key by using the service network identifier, the slice identifier and other parameters, and derive the access stratum key and the non-access stratum key by using the intermediate key after receiving the user authentication request from the slice and authenticating successfully the slice.

From the description of the embodiment described above, it will be apparent to those skilled in the art that the method in the embodiment described above may be implemented by software plus a necessary general-purpose hardware platform, or may of course be implemented by hardware. However, in many cases, the former is a preferred implementation mode. Based on this understanding, the solution provided by the present disclosure substantially, or the part contributing to the related art, is embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device, etc.) to execute the method according to each embodiment of the present disclosure.

Embodiment 2

A key derivation device is further provided in this embodiment. The device is configured to implement the above-mentioned embodiments and preferred embodiments. What has been described will not be repeated. As used below, the term "module" may be software or hardware capable of implementing predetermined functions, or a combination thereof. The apparatus in the embodiments described below is preferably implemented by software, but implementation by hardware or by a combination of software and hardware is also possible and conceived.

Figure 4:
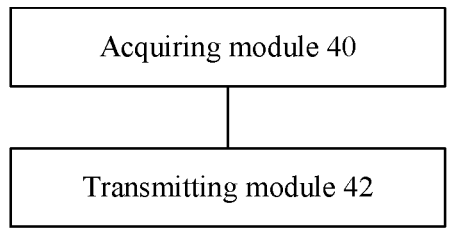
FIG. 4 is a block diagram 1 of a key derivation device according to an embodiment 2 of the present disclosure.

FIG. 4 is a block diagram 1 of a key derivation device according to an embodiment 2 of the present disclosure. As shown in FIG. 4, the device includes an acquiring module 10 and a transmitting module 42.

The acquiring module 40 is configured to acquire a slice identifier corresponding to a network slice to which a user equipment (UE) is currently attached, where the slice identifier uniquely identifies the network slice.

The transmitting module 42 is configured to transmit the slice identifier to a designated communication device, where the slice identifier is configured to instruct the designated communication device to derive, according to the slice identifier, an intermediate key required by the network slice.

Through the combined effect of modules described above, the slice identifier is transmitted to the designated communication device, and the designated communication device may derive the intermediate key corresponding to the network slice according to the received slice identifier. By means of this technical solution, the problem in the related art that a slice function cannot be implemented normally due to the fact that different network slices probably use the same intermediate key is solved, and different network slices correspond to different intermediate keys, thereby avoiding a case that the slicing function cannot be implemented normally caused by allocating the same intermediate key to different network slices.

Alternatively, the transmitting module 42 is further configured to, when the designated communication device includes at least one of a user data center and a user authentication center, transmit a first authentication request to the designated communication device, where the first authentication request carries the slice identifier.

Figure 5:
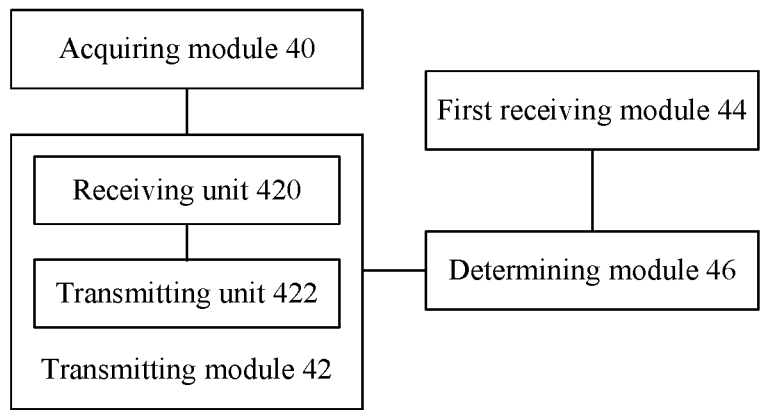
FIG. 5 is a block diagram 2 of a key derivation device according to the embodiment 2 of the present disclosure.

FIG. 5 is a block diagram 2 of a key derivation device according to the embodiment 2 of the present disclosure.

The above-mentioned transmitting module 42 further includes, when the designated communication device is the UE, a receiving unit 420 and a transmitting unit 422.

The receiving unit 420 is configured to receive response information for the first authentication request, where the response information carries a security authentication vector.

The transmitting unit 422 is configured to transmit a second authentication request to the designated communication device according to the security authentication vector, where the second authentication request carries the slice identifier.

In this embodiment, the device further includes a first receiving module 44 and a determining module 46.

The first receiving module 44 is configured to, in response to determining that the UE needs to be handed over from the network slice currently attached by the UE to a second network slice, receive an attach request message forwarded by an access network (AN), where the attach request message carries a service identifier.

The determining module 46 is configured to determine whether a service range of the second network slice includes a service corresponding to the service identifier.

The transmitting module 42, in response to determining that the service range includes the service corresponding to the service identifier, transmits the slice identifier to the designated communication device.

Figure 6:
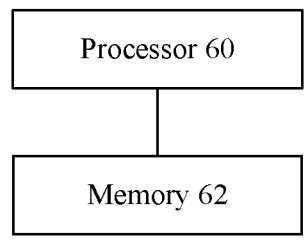
FIG. 6 is a block diagram 3 of a key derivation device according to the embodiment 2 of the present disclosure.

FIG. 6 is a block diagram 3 of a key derivation device according to the embodiment 2 of the present disclosure. A key derivation device is further provided in this embodiment. As shown in FIG. 6, the device includes a processor 60 and a memory 62.

The memory 62 is configured to store instructions executable by the processor. The processor 60 is configured to acquire a slice identifier corresponding to a network slice to which the UE is currently attached, and transmit the slice identifier to a designated communication device. The slice identifier uniquely identifies the network slice, and the slice identifier is configured to instruct the designated communication device to derive, according to the slice identifier, an intermediate key required by the network slice.

Embodiment 3

Figure 7:
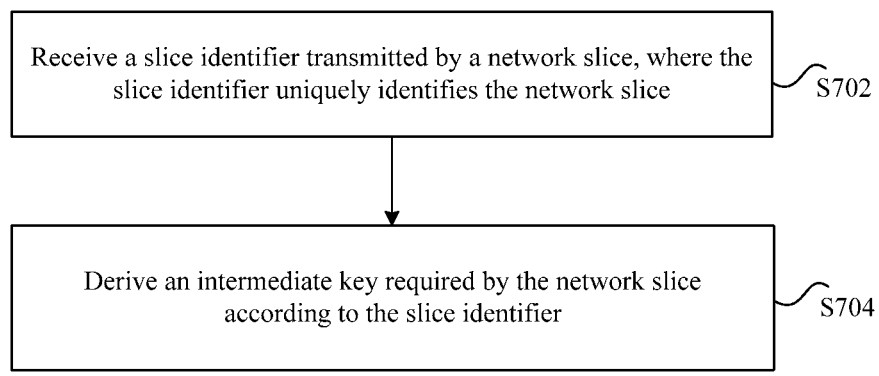
FIG. 7 is another flowchart of the key derivation method according to the embodiment 1 of the present disclosure.

A key derivation method is further provided in this embodiment. FIG. 7 is another flowchart of the key derivation method according to the embodiment 1 of the present disclosure. As shown in FIG. 7, the method includes steps described below.

In step S702, a slice identifier transmitted by a network slice is received, where the slice identifier uniquely identifies the network slice.

In step S704, an intermediate key required by the network slice is derived according to the slice identifier.

Through the steps described above, the slice identifier is transmitted to the designated communication device, and the designated communication device may derive the intermediate key corresponding to the network slice according to the received slice identifier. By means of this technical solution, the problem in the related art that the slice function cannot be implemented normally due to the fact that different network slices probably use the same intermediate key is solved, and different network slices correspond to different intermediate keys, thereby avoiding a case that the slicing function cannot be implemented normally caused by allocating the same intermediate key to different network slices.

The step S702 may be implemented in various modes. In this embodiment, the step S702 may be implemented in the following mode: receiving an authentication request transmitted by the network slice, where the authentication request carries the slice identifier. That is, the network slice transmits the authentication request carrying the slice identifier to the designated device, specially, the designated device may be the UE.

In this embodiment, the slice identifier includes at least one of: identifier information of the network slice and temporary identifier information allocated by the network slice to the UE.

Embodiment 4

A key derivation device is further provided in this embodiment. The device is configured to implement the above-mentioned embodiments and preferred embodiments. What has been described will not be repeated. As used below, the term "module" may be software or hardware capable of implementing predetermined functions, or a combination thereof. The apparatus in the embodiments described below is preferably implemented by software, but implementation by hardware or by a combination of software and hardware is also possible and conceived.

Figure 8:
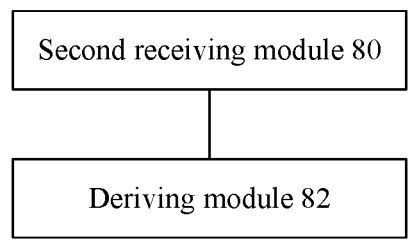
FIG. 8 is a block diagram 4 of a key derivation device according to an embodiment 3 of the present disclosure.

FIG. 8 is a block diagram 4 of a key derivation device according to an embodiment 3 of the present disclosure. As shown in FIG. 8, the device includes a second receiving module 80 and a deriving module 82.

The second receiving module 80 is configured to receive a slice identifier transmitted by a network slice, where the slice identifier uniquely identifies the network slice.

The deriving module 82 is configured to derive an intermediate key required by the network slice according to the slice identifier.

Through the combined effect of modules described above, the slice identifier is transmitted to the designated communication device, and the designated communication device may derive the intermediate key corresponding to the network slice according to the received slice identifier. By means of this technical solution, the problem in the related art that a slice function cannot be implemented normally due to the fact that different network slices probably use the same intermediate key is solved, and different network slices correspond to different intermediate keys, thereby avoiding a case that the slicing function cannot be implemented normally caused by allocating the same intermediate key to different network slices.

Alternatively, the second receiving module 80 is further configured to receive an authentication request transmitted by the network slice, where the authentication request carries the slice identifier.

In order to better understand the process of the key derivation described above, the above-mentioned technical solution is described below in conjunction with the preferred embodiments which are not intended to limit the embodiments of the present disclosure.

Preferred Embodiment 1

Figure 9:
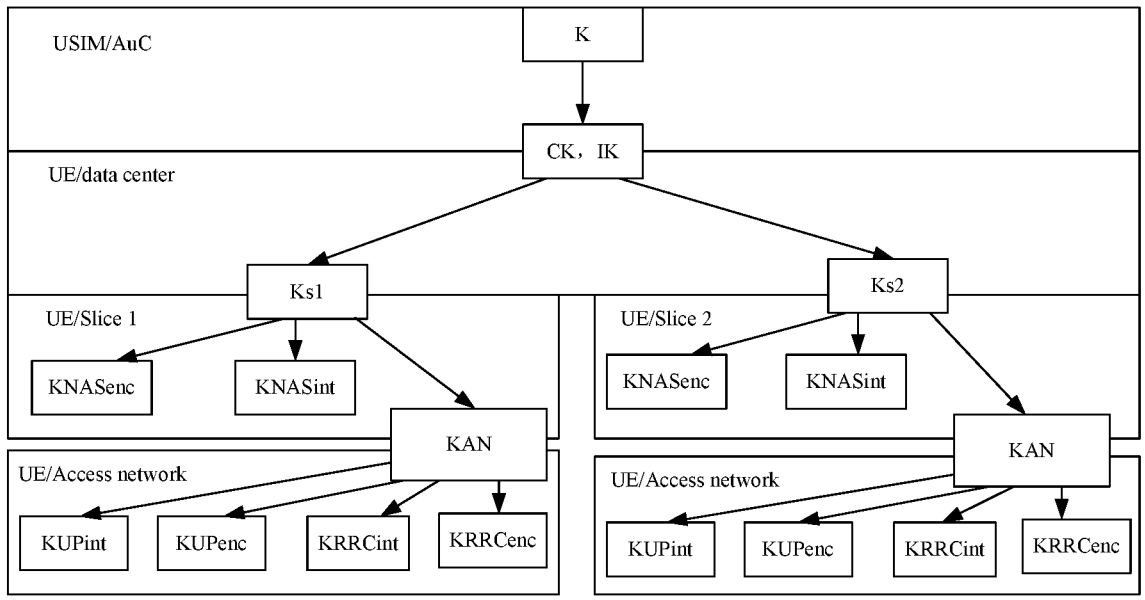
FIG. 9 is a schematic diagram showing keys of layers according to a preferred embodiment 1 of the present disclosure.

FIG. 9 is a schematic diagram of keys of layers according to a preferred embodiment 1 of the present disclosure. As shown in FIG. 9, in a slice key hierarchical derivation system, a smart authentication card and an authentication center of the terminal respectively save the user's root key (K), an encryption key (CK) and an integrity protection key (IK) are derived by using a key generation algorithm, and the terminal and each slice derive intermediate keys (Ks1 and Ks2) by using the key generation algorithm.

Preferred Embodiment 2

Figure 10:
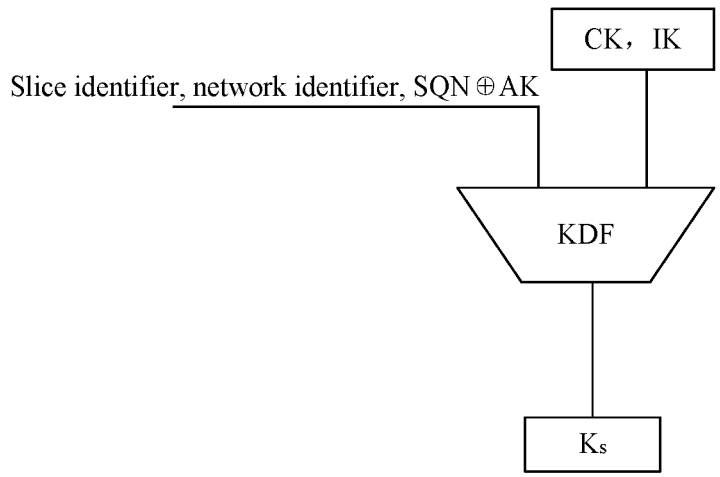
FIG. 10 is a schematic diagram of an intermediate key derivation algorithm according to a preferred embodiment 2 of the present disclosure.

FIG. 10 is a schematic diagram of an intermediate key derivation algorithm according to a preferred embodiment 2 of the present disclosure. As shown in FIG. 10, the intermediate key derivation algorithm is as follows.

Ks1 or Ks2=key generation function (KDF) (the slice identifier, a network service identifier, a key sequence number (SQN) ⊕ anonymous key (AK), the CK and the IK), where the AK is derived from, according to the key derivation algorithm (f5), the K and a random number and used to hide the SQN. ⊕ is an XOR algorithm. In response to determining that the SQN does not need to be hidden, the AK is set to all 0s, and the CK and the IK are derived from the root key K.

It is to be noted that the slice identifier may include only the identifier information of the slice, or may include the user temporary identifier information. That is, the slice identifier may also be the slice user temporary identifier allocated by the slice to the user. The slice user temporary identifier=the slice identifier+the user temporary identifier. For example, the slice identifier is 32 bits, and the user temporary identifier is 32 bits.

Preferred Embodiment 3

Figure 11:
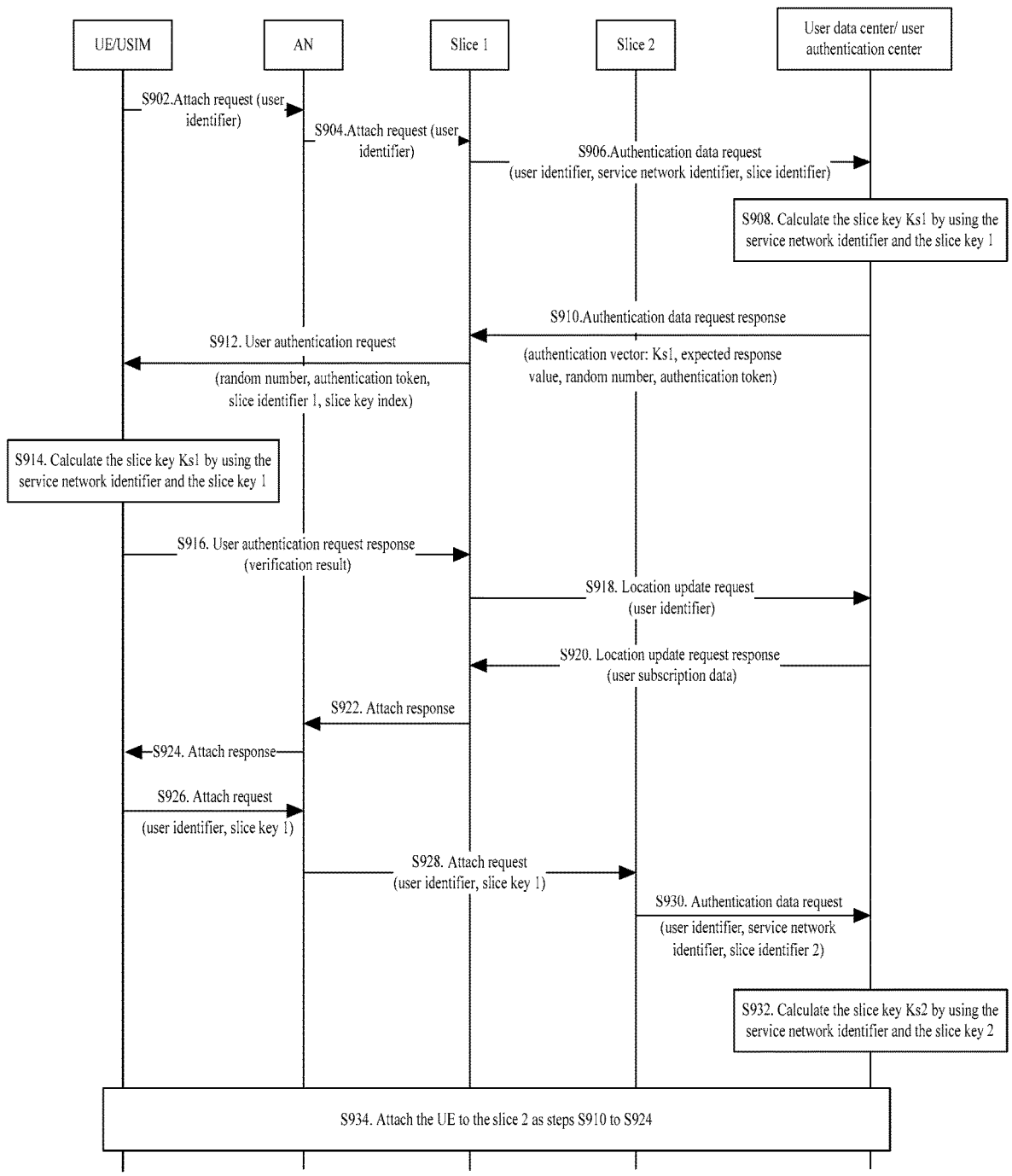
FIG. 11 is a flowchart of the intermediate key generation according to a preferred embodiment 3 of the present disclosure.

FIG. 11 is a flowchart of intermediate key generation according to a preferred embodiment 3 of the present disclosure. As shown in FIG. 11, the steps in the preferred embodiment 3 of the present disclosure are specifically described below.

In step S902, the UE with the smart authentication card initiates the attach message to the access network (AN). The attach message carries a user identifier. The user identifier may be an international mobile subscriber identification number (IMSI), or may be the slice user temporary identifier allocated by the slice to the user. The attach message may further include the service identifier attached by the user.

In step S904, the AN, according to the slice user temporary identifier or the service identifier, chooses a slice 1 for the UE and forwards the attach request message to the slice 1.

In step S906, the slice 1 checks the service identifier. If the service identifier does not match with the service range of the slice 1, the attach request message is rejected. If the user identifier is the IMSI, the slice 1 allocates the slice user temporary identifier to the user, and transmits an authentication data request message to the user data center/the user authentication center. In another example, the user identifier is a slice 1 user temporary identifier and the service of the slice 1 has a pool of slices, that is, the slice 1 shares security context with other slices, the user security context is acquired from the other slices (for example, a slice 3) according to the slice identifier in the slice user temporary identifier. When the user security context is acquired successfully, the method proceeds to steps S912 to S914. When the user security context fails to be acquired, the user identifier IMSI is acquired from the UE, the slice 1 user temporary identifier is allocated to the user, and the authentication data request message is transmitted to the user data center/the user authentication center. The authentication data request message carries the user identifier IMSI, the network service identifier, and one of the slice identifier 1 and the slice 1 user temporary identifier.

In step S908, the user data center/the user authentication center derives the intermediate key Ks1 by using the key derivation algorithm shown in FIG. 8.

Ks1=key generation function (KDF) (the slice identifier 1 or the slice 1 user temporary identifier, the network service identifier, the SQN ⊕ AK, the CK and the IK).

In step S910, the user data center/the user authentication center transmits back an authentication data request response message to the slice 1. The authentication data request response message carries one or more sets of authentication vectors, where each authentication vector includes Ks1, an expected response value, a random number and an authentication token.

In step S912, the slice 1 allocates a corresponding slice key index for Ks1, and transmits a user authentication request message to the UE. The user authentication request message carries the slice key index, the random number, the authentication token and one of the slice identifier 1 and the slice 1 user temporary identifier.

In step S914, the UE authenticates the token, finds that the slice 1 is an authentication success network, saves the slice identifier or the slice 1 user temporary identifier as well as a correspondence with the service identifier, derives the intermediate key Ks1 by using the key derivation algorithm shown in FIG. 8, and derives an access stratum key and a non-access stratum key.

Ks1=key generation function (KDF) (the slice identifier 1 or the slice 1 user temporary identifier, the network service identifier, the SQN ⊕ AK, the CK and the IK).

In step S916, the UE transmits back a user authentication request response message to the slice 1. The user authentication request response message carries a authentication result.

In step S918, the slice 1 compares the authentication result in the user authentication request response message with the expected response value in the authentication vector. If the authentication result is equal to the expected response value, the slice 1 authenticates the UE successfully, derives the access stratum key and the non-access stratum key, and then sends a location update request message to the user data center/the authentication center, where the location update request message carries the user identity IMSI.

In step S920, the user data center/the user authentication center transmits back a location update request response message to the slice 1. The location update request response message carries user subscription data.

In step S922, the slice 1 saves the user subscription data, and transmits back an attach success response to the AN.

In step S924, the AN forwards the attach success response to the UE. At this point, the UE successfully attaches to the slice 1, and implements the service in the slice 1.

In step S926, when the UE moves or when the UE needs to implement other services (such as a vehicle-to-everything service), the UE transmits the attach request message to the AN. The attach request message carries the user identifier. The user identifier may be the IMSI or the slice 1 user temporary identifier. The attach request message also carries the service identifier (such as the vehicle-to-everything service).

In step S928, the AN, according to the service identifier, chooses a slice 2 and transmits the attach request message to the slice 2.

In step S930, the slice 2 checks the service identifier. If the service identifier does not match with the service range of the slice 2, the slice 2 rejects the attach request message. If the user identifier is the IMSI, the slice 2 allocates a slice 2 user temporary identifier to the user, and transmits the authentication data request message to the user data center/ the user authentication center. In another example, the service of the slice 1 is different the service of the slice 2 and the security context of the slice 1 cannot be used, the slice 2 acquires the user security IMSI from the UE, allocates the slice 2 user temporary identifier to the user, and transmits the authentication data request message to the user data center/ the user authentication center. The authentication data request message carries the user identifier IMSI, the network service identifier, and one of the slice 2 identifier and the slice 2 user temporary identifier.

In step S932, the user data center/the user authentication center derives the intermediate key Ks2 by using the key derivation algorithm shown in FIG. 8.

Ks2=key generation function (KDF) (the slice identifier 2 or the slice 2 user temporary identifier, the network service identifier, the SQN $\oplus$ AK, the CK and the IK).

In step S934, the UE is attached to the slice 2 by performing steps S910 to S924. At this point, the UE is attached to the slice 2, and saves the correspondence between the service identifier and the slice 2 identifier or the slice 2 temporary identifier. If the attach process occurs due to the service change, the UE selects a different slice identifier or slice user temporary identifier according to the service identifier.

In conclusion, the embodiments of the present disclosure achieve the effects of solving the problem in the related art that a slice function cannot be implemented normally due to the fact that different network slices probably use the same intermediate key, making different network slices correspond to different intermediate keys, and avoiding a case that the slice function cannot be implemented normally caused by allocating the same intermediate key to different network slices.

A storage medium is provided by an embodiment of the present disclosure. Alternatively, in this embodiment, the storage medium may be configured to store program codes for executing the key derivation method in the above-mentioned embodiment 1.

Alternatively, in the embodiment, the storage medium may be located in any one of a group of computer terminals in a computer network, or located in any one of a group of mobile terminals in the computer network.

Alternatively, in this embodiment, the storage medium is configured to store program codes for executing the steps described below.

In step S1, a slice identifier corresponding to a network slice to which a user equipment (UE) is currently attached is acquired, where the slice identifier uniquely identifies the network slice.

In step S2, the slice identifier is transmitted to a designated communication device, where the slice identifier is configured to instruct the designated communication device to derive, according to the slice identifier, an intermediate key required by the network slice.

The serial numbers of the above embodiments of the present disclosure are merely for ease of description and do not indicate superiority and inferiority of the embodiments.

In the above embodiments of the present disclosure, the description of each embodiment has its own emphasis. For a part not described in detail in one embodiment, reference may be made to related description of other embodiments.

It is to be understood that the technical content disclosed in embodiments of the present application may be implemented in other ways. The device embodiments described above are merely illustrative. For example, the units are classified merely based on their logical functions, and, in practice, the unit classification may be implemented in other ways. For example, multiple units or components may be combined or may be integrated into another system, or some features may be ignored or not executed. Additionally, the presented or discussed mutual coupling, direct coupling or communication connections may be indirect coupling or communication connections via interfaces, units or modules, or may be electrical or in other forms.

The units described above as separate components may or may not be physically separated. Components presented as units may or may not be physical units, i.e., may be located in one place or may be distributed on multiple network units. Part or all of these units may be selected according to actual requirements to achieve objects of the solutions in the embodiments of the present disclosure.

Additionally, various functional units in embodiments of the present disclosure may be integrated into one processing unit, or each unit may be physically present separately, or two or more units may be integrated into one unit. The integrated unit may be implemented by hardware or a software functional unit.

The integrated unit may be stored in a computer-readable storage medium if implemented in the form of a software functional unit and sold or used as an independent product. Based on this understanding, solutions provided by the present disclosure substantially, or the part contributing to the related art, may be embodied in the form of a software product. The computer software product is stored on a storage medium and includes several instructions for enabling a computer device (which may be a personal computer, a server, a network device or the like) to execute all or part of steps in the methods provided by embodiments of the present disclosure. The foregoing storage medium includes: a USB flash drive, a read-only memory (ROM), a random access memory (RAM), a mobile hard disk, a magnetic disk, an optical disk or another medium capable of storing program codes.

The above are only preferred embodiments of the present disclosure and are not intended to limit the present disclosure. For those skilled in the art, the present disclosure may have various modifications and variations. Any modifications, equivalent substitutions, improvements and the like made within the spirit and principle of the present disclosure should fall within the scope of the present disclosure.

INDUSTRIAL APPLICABILITY

According to the technical solution provided by the embodiments of the present disclosure, the slice identifier is transmitted to the designated communication device, and the designated communication device may derive the intermediate key corresponding to the network slice according to the received slice identifier. By means of this technical solution, different network slices correspond to different intermediate keys, solving the problem in the related art that different network slices probably use the same intermediate key and the slice function cannot be implemented normally, thereby avoiding a case that the slicing function cannot be implemented normally caused by allocating the same intermediate key to different network slices.

What is claimed is:
1. A key derivation method, comprising:
acquiring, by a first network slice to which a user equipment (UE) is currently attached, a slice identifier corresponding to the first network slice, wherein the slice identifier uniquely identifies the first network slice; and transmitting, by the first network slice, the slice identifier to a designated communication device, wherein the slice identifier is configured to instruct the designated communication device to derive, according to the slice identifier, an intermediate key required by the first network slice;

wherein the transmitting the slice identifier to a designated communication device comprises: transmitting a first authentication request to the designated communication device, wherein the first authentication request carries the slice identifier and a service network identifier;

wherein the intermediate key is derived according to the slice identifier and the service network identifier by using a key generation function (KDF) which is a function of the slice identifier, the service network identifier, a key sequence number (SQN) ⊕ an anonymous key (AK), an encryption key (CK) and an integrity protection key (IK);

wherein the AK is derived from, according to a key derivation algorithm f5, a root key and a random number and used to hide the SQN, ⊕ is an XOR algorithm, and the CK and the IK are both derived from the root key.

2. The method according to claim 1, wherein the designated communication device comprises at least one of: a user data center and a user authentication center.

3. The method according to claim 2, further comprising:
receiving response information for the first authentication request, wherein the response information carries a security authentication vector; and
transmitting a second authentication request to the UE according to the security authentication vector,
wherein the UE derives the intermediate key according to the second authentication request.

4. The method according to claim 1, further comprising:
in response to determining that the UE needs to be handed over from the first network slice to a second network slice, receiving an attach request message transmitted by an access network (AN), wherein the attach request message carries a service identifier;
determining whether a service range of the second network slice comprises a service corresponding to the service identifier; and
in response to determining that the service range of the second network slice comprises the service corresponding to the service identifier, transmitting the slice identifier of the second network slice to the designated communication device.

5. The method according to claim 4, wherein the slice identifier of the second network slice comprises at least one of: identifier information of the second network slice and temporary identifier information allocated by the second network slice to the UE.

6. The method of claim 1, wherein the slice identifier comprises at least one of: identifier information of the first network slice and temporary identifier information allocated by the first network slice to the UE.

7. A key derivation method, comprising:
receiving a slice identifier transmitted by a network slice, wherein the slice identifier uniquely identifies the network slice; and
deriving an intermediate key required by the network slice according to the slice identifier;
wherein the receiving a slice identifier transmitted by a network slice comprises: receiving an authentication request transmitted by the network slice, wherein the authentication request carries the slice identifier and a service network identifier;

wherein the intermediate key is derived according to the slice identifier and the service network identifier by using a key generation function (KDF) which is a function of the slice identifier, the service network identifier, a key sequence number (SQN) ⊕ an anonymous key (AK), an encryption key (CK) and an integrity protection key (1K);

wherein the AK is derived from, according to a key derivation algorithm f5, a root key and a random number and used to hide the SQN, ⊕ is an XOR algorithm, and the CK and the IK are both derived from the root key.

8. The method according to claim 7, wherein the slice identifier comprises at least one of: identifier information of the network slice and temporary identifier information allocated by the network slice to a user equipment (UE).

9. The method according to claim 7, wherein the slice identifier comprises at least one of: identifier information of the network slice and temporary identifier information allocated by the network slice to a user equipment (UE).

10. A key derivation device, comprising:
a processor; and
a memory, configured to store instructions executable by the processor;
wherein the processor is configured to acquire a slice identifier corresponding to a first network slice to which a user equipment (UE) is currently attached, and transmit the slice identifier to a designated communication device, wherein the slice identifier uniquely identifies the first network slice, and the slice identifier is configured to instruct the designated communication device to derive, according to the slice identifier, an intermediate key required by the first network slice;
wherein the processor is configured to transmit a first authentication request to the designated communication device,
wherein the first authentication request carries the slice identifier and a service network identifier;
wherein the intermediate key is derived according to the slice identifier and the service network identifier by using a key generation function (KDF) which is a function of the slice identifier, the service network identifier, a key sequence number (SQN) ⊕ an anonymous key (AK), an encryption key (CK) and an integrity protection key (1K);
wherein the AK is derived from, according to a key derivation algorithm f5, a root key and a random number and used to hide the SQN, ⊕ is an XOR algorithm, and the CK and the IK are both derived from the root key.

11. The key derivation device according to claim 10, wherein the designated communication device comprises at least one of: a user data center and a user authentication center.

12. The key derivation device according to claim 11, wherein the processor is further configured to:
receive response information for the first authentication request, wherein the response information carries a security authentication vector; and
transmit a second authentication request to the UE according to the security authentication vector, wherein the second authentication request carries the slice identifier, wherein the UE derives the intermediate key according to the second authentication request.

13. The key derivation device according to claim 10, wherein the processor is further configured to:
in response to determining that the UE needs to be handed over from the first network slice to a second network slice, receive an attach request message transmitted by an access network (AN), wherein the attach request message carries a service identifier;
determine whether a service range of the second network slice comprises a service corresponding to the service identifier; and
in response to determining that the service range of the second network slice comprises the service corresponding to the service identifier, transmit the slice identifier of the second network slice to the designated communication device.

14. The key derivation device according to claim 13, wherein the slice identifier of the second network slice comprises at least one of: identifier information of the second network slice and temporary identifier information allocated by the second network slice to the UE.

15. The key derivation device according to claim 10, wherein the slice identifier comprises at least one of: identifier information of the first network slice and temporary identifier information allocated by the first network slice to the UE.

* * * * *

UNITED STATES PATENT AND TRADEMARK OFFICE
CERTIFICATE OF CORRECTION

PATENT NO. : 11,290,876 B2
APPLICATION NO. : 16/320704
DATED : March 29, 2022
INVENTOR(S) : Shilin You et al.

Page 1 of 1

It is certified that error appears in the above-identified patent and that said Letters Patent is hereby corrected as shown below:

In the Claims

Claim 7, Column 16, Line 10, "(1K)" should be changed to -- (IK) --

Claim 10, Column 16, Line 49, "(1K)" should be changed to -- (IK) --

Signed and Sealed this
First Day of April, 2025

Coke Morgan Stewart
*Acting Director of the United States Patent and Trademark Office*